United States Patent
Ichikawa et al.

(10) Patent No.: US 7,880,372 B2
(45) Date of Patent: Feb. 1, 2011

(54) LED LAMP SYSTEM AND METHOD OF MAKING SAME

(75) Inventors: Tadaoki Ichikawa, Aichi-ken (JP); Yukihiko Umeda, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 37 days.

(21) Appl. No.: 12/379,985

(22) Filed: Mar. 5, 2009

(65) Prior Publication Data

US 2009/0224645 A1    Sep. 10, 2009

(30) Foreign Application Priority Data

Mar. 6, 2008  (JP)  ............... 2008-056663
Dec. 26, 2008 (JP)  ............... 2008-332188

(51) Int. Cl.
*H01R 13/66*  (2006.01)
*H01R 13/717* (2006.01)
*F21V 21/00*  (2006.01)
*F21S 2/00*   (2006.01)

(52) U.S. Cl. .................. 313/51; 362/249.02; 362/555; 362/631; 362/646; 362/800

(58) Field of Classification Search .................. None
See application file for complete search history.

(56) References Cited

U.S. PATENT DOCUMENTS 6,550,953 B1    4/2003  Ichikawa et al.
6,623,152 B1 *  9/2003  Kroening ................ 362/555
6,727,652 B2 *  4/2004  Sivacumarran ............ 315/58
7,307,391 B2 * 12/2007  Shan .................... 315/291
2007/0058378 A1 * 3/2007 Moriyama et al. .......... 362/378
2007/0121326 A1 * 5/2007 Nall et al. ................. 362/294
2007/0127216 A1   6/2007 Kamiya et al.

FOREIGN PATENT DOCUMENTS

| JP | 2001-243829 | 9/2001 |
|----|-------------|--------|
| JP | 2002-36950  | 2/2002 |
| JP | 2002-100427 | 4/2002 |
| JP | 2003-217705 | 7/2003 |
| JP | 2007-184547 | 7/2007 |

* cited by examiner

*Primary Examiner*—Ashok Patel
(74) *Attorney, Agent, or Firm*—McGinn IP Law Group, PLLC

(57) ABSTRACT

An LED lamp system includes a light emitting diode (LED) lamp, a printed circuit board on which the LED lamp is mounted, a connection terminal including a soldering part inserted and soldered to the printed circuit board, a body part extending parallel to the printed circuit board, and a branch part extending from the body part in a predetermined direction, a case to which the printed circuit board is fixed, the case including a holding portion for holding the branch part of the connection terminal, and a cover for enclosing the LED lamp and the printed circuit board in association with the case.

8 Claims, 5 Drawing Sheets

- 3 CONNECTION TERMINAL
- 31 LEAD MEMBER
- 312 BRANCH PART
- 311 SOLDERING PART
- 32
- 322
- 321

- 11 LED LAMP SYSTEM
- 52 CYLINDRICAL PORTION
- 61 NAIL PORTION
- 54 ATTACHMENT HOLE
- 5 CASE

US 7,880,372 B2

LED LAMP SYSTEM AND METHOD OF MAKING SAME

The present application is based on Japanese patent application Nos. 2008-056663 and 2008-332188 filed Mar. 6, 2008 and Dec. 26, 2008, respectively, the entire contents of which are incorporated herein by reference.

BACKGROUND OF THE INVENTION

1. Field of the Invention

This invention relates to an LED lamp system and a method of making the LED lamp system.

2. Description of the Related Art

Conventional LED lamps include a bullet type or SMD (surface mount device). For example, an LED lamp system for a vehicle lamp is constructed such that leads of the LED lamp are soldered to a printed circuit board (PCB) and the PCB is then secured to a case portion, and installed at a given position of the vehicle. The PCB is wired to a lighting control device of the vehicle such that flashing of the LED and brightness or emission color of the lighted LED are controlled by a vehicle switch or a control circuit.

JP-A-2002-036950 and 2001-243829 disclose LED lamp systems that an LED lamp is bonded to PCB. JP-A-2007-184547 discloses an LED lamp system that a circuit portion to which an LED lamp is bonded is formed with a metal board.

The LED lamp system of JP-A-2007-184547 is excellent in heat radiation since the metal board is used instead of the PCB. However, since the metal board is used both as a connection terminal (or connector) for electrical attachment and a circuit portion, external force applied to the connection terminal when attached to, e.g., an external connector on a vehicle may be directly transferred to the circuit. Thereby, electrical or electronic parts etc. mounted on the metal board may cause a malfunction.

In the LED lamp systems of JP-A-2002-036950 and 2001-243829, although the above problem may be solved since connection terminal is soldered to the PCB, the external force when attached thereto is directly applied to a soldering part and a crack or electrical connection failure may be thereby caused to lower the reliability.

In order to solve this problem, the number of the soldering parts may be increased (e.g., as shown in FIG. 4 of JP-A-2002-036950) along the connection terminal for dispersing the external force. However, a certain distance needs to be secured between the soldering part and the circuit portion so as not to transfer heat to the circuit portion during soldering. Thus, when the number of the soldering parts increases, the downsizing of the lamp system will be impaired since a space is further needed to secure the distance and to dispose the soldering parts. Especially in case of an in-vehicle light source, this problem will be more serious since the light source needs to be placed in a very limited space in the vehicle.

SUMMARY OF THE INVENTION

It is an object of the invention to provide an LED lamp system that can prevent a malfunction due to external force when attached to an external connector while being further downsized and providing a circuit portion on PCB.

It is a further object of the invention to provide a method of making the LED lamp system.

(1) According to one embodiment of the invention, an LED lamp system comprises:
a light emitting diode (LED) lamp;
a printed circuit board on which the LED lamp is mounted;
a connection terminal comprising a soldering part inserted and soldered to the printed circuit board, a body part extending parallel to the printed circuit board, and a branch part extending from the body part in a predetermined direction;
a case to which the printed circuit board is fixed, the case comprising a holding portion for holding the branch part of the connection terminal; and
a cover for enclosing the LED lamp and the printed circuit board in association with the case.

In the above embodiment (1), the following modifications, changes and a combination thereof can be made.

(i) The branch part of the connection terminal is sandwiched by the case and the printed circuit board.

(ii) The cover comprises a support portion formed opposite the branch part of the connection terminal in relation to the printed circuit board for supporting the printed circuit board.

(2) According to another embodiment of the invention, a method of making a light emitting diode (LED) lamp system comprises:

inserting and soldering a soldering part of a connection terminal to a printed circuit board on which an LED lamp is mounted such that a body part of the connection terminal is disposed parallel to the printed circuit board;

fixing the printed circuit board to a case such that a branch part extending in a predetermined direction from the body part of the connection terminal is held by a holding portion formed in the case; and attaching the cover to the case such that the LED lamp and the printed circuit board are enclosed by the case and the cover.

In the above embodiment (2), the following modifications, changes and a combination thereof can be made.

(iii) The branch part of the connection terminal is sandwiched by the case and the printed circuit board when attaching the cover to the case.

(iv) The printed circuit board is supported by a support portion of the cover formed opposite the branch part of the connection terminal in relation to the printed circuit board when attaching the cover to the case.

(3) According to another embodiment of the invention, an LED lamp system comprises:
a light emitting diode (LED) lamp;
a printed circuit board on which the LED lamp is mounted;
a case engaging with and supporting the printed circuit board; and
a cover for enclosing the LED lamp and the printed circuit board in association with the case;
wherein the printed circuit board comprises a connection terminal protruding from the cover and the case for connecting to an external connector, the connection terminal comprising a soldering part inserted and soldered to the printed circuit board, and a branch part folded opposite the soldering part, and
wherein the branch part is sandwiched and held by a holding portion formed on an inside wall of the case for preventing a failure caused by external force applied when connecting the connection terminal to the external connector.

The above LED lamp system is composed such that the connection terminal soldered to the printed circuit board for connecting to the external connector is provided with the branch part, and the case for enclosing the printed circuit board is provided with the holding portion for holding the branch part so as to prevent deformation of the connection terminal by the branch part and the holding portion. Thus, deformation of the connection terminal can be prevented when external force is excessively applied to the connection terminal, and the external force can be prevented from concentrating on the solder joint portion, i.e., the soldering part so that no crack or electrical connection failure can be caused therein.

In the above embodiment (3), the following modifications, changes and a combination thereof can be made.

(v) The branch part is disposed on the printed circuit board, and sandwiched and held by the holding portion and the printed circuit board.

Thereby, the external force applied to the soldering part can be further reduced, and the branch part can be prevented from being detached from the holding portion.

(vi) The cover comprises a support portion formed opposite the branch part in relation to the printed circuit board for supporting the printed circuit board.

Thereby, external force applied to the printed circuit board can be also reduced to prevent a malfunction in a circuit or a circuit protection element mounted on the printed circuit board.

(vii) The case comprises a cylindrical portion for supporting a rod-like light guiding member, and the system is used as an in-vehicle light source for emitting light through the rod-like light guiding member.

(viii) The case comprises an attachment hole for attaching the system to an vehicle, and the attachment hole is threaded on an inside wall thereof.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1A:
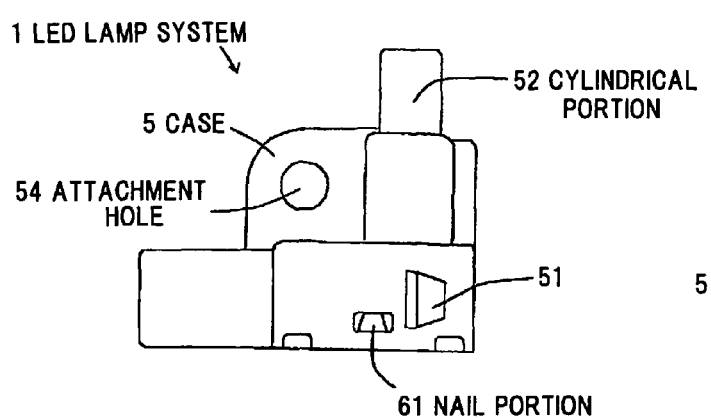
FIG. 1A is a right side view showing an LED lamp system in a first preferred embodiment according to the invention.
Figure 1D:
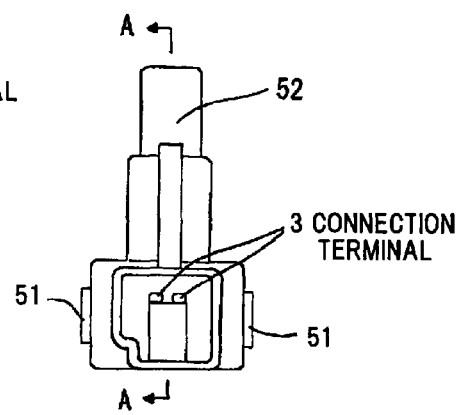
FIG. 1D is a front view showing the LED lamp system.
Figure 1B:
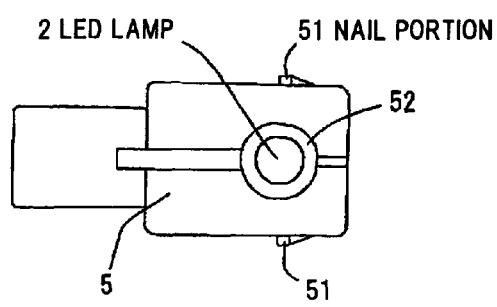
FIG. 1B is a top view showing the LED lamp system.
Figure 1C:
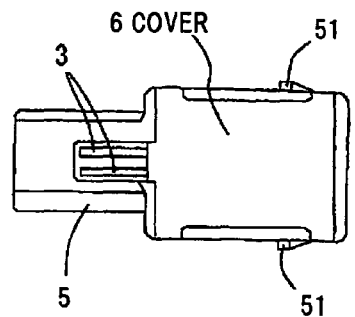
FIG. 1C is a bottom view showing the LED lamp system.
Figure 2:
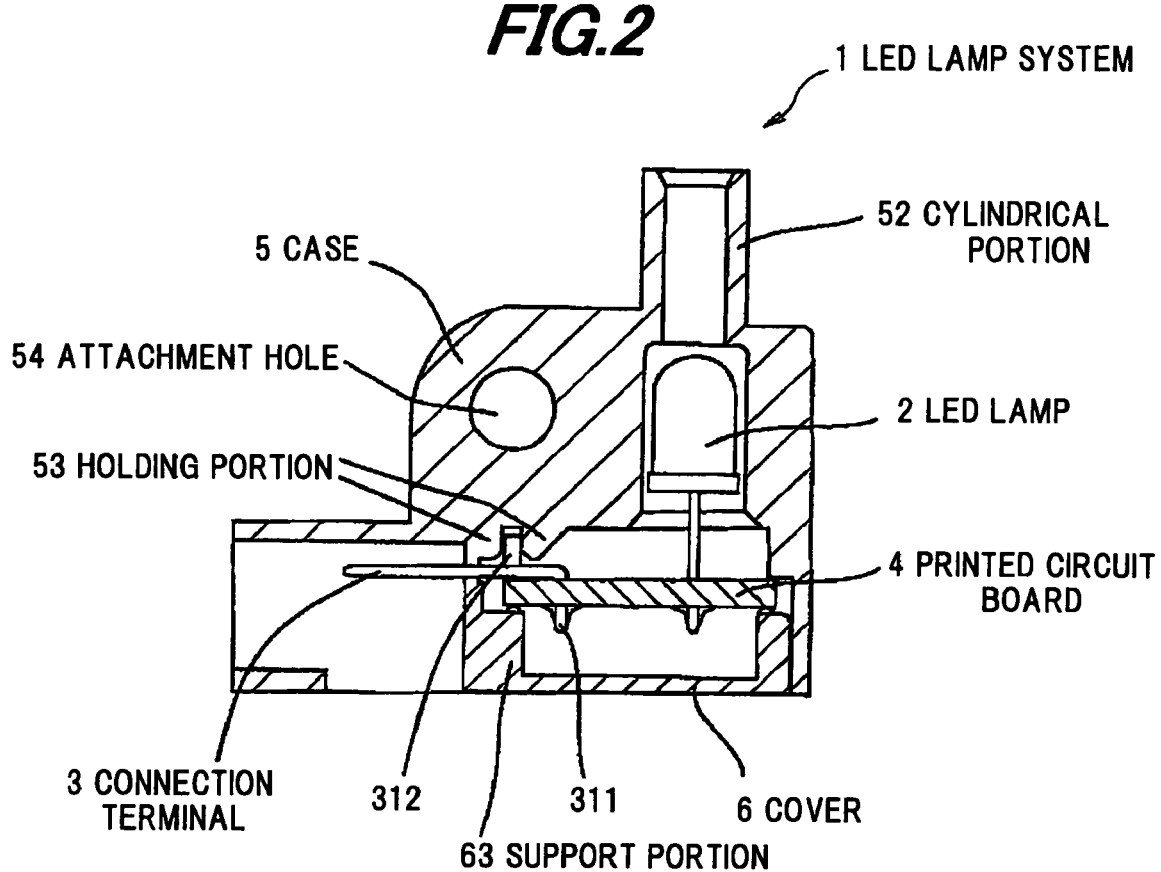
FIG. 2 is a cross sectional view showing the LED lamp system of the first embodiment.
Figure 3:
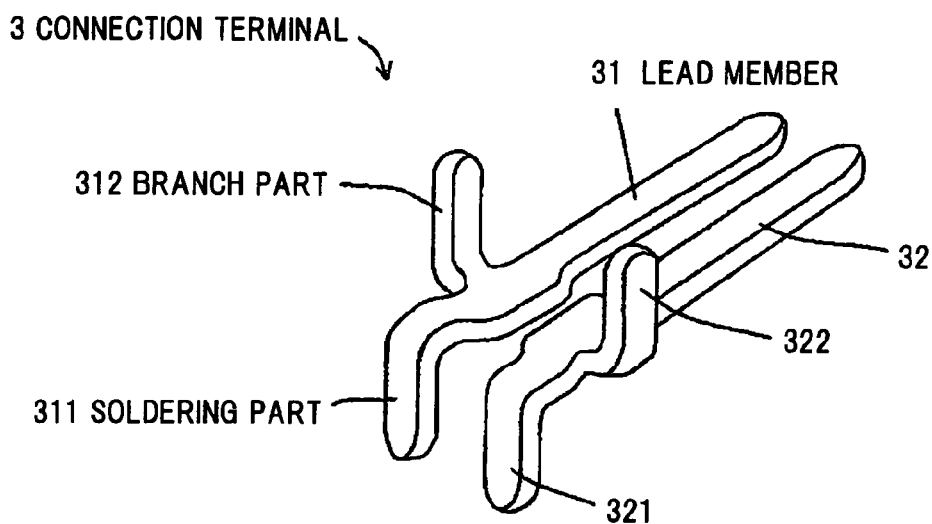
FIG. 3 is a perspective view showing connection terminals used for the LED lamp system of the first embodiment.

The first preferred embodiments of the invention will be explained below referring to the drawings. FIGS. 1A to 1D each show the appearance of an LED lamp system 1 of the first embodiment, where FIG. 1A, FIG. 1B, FIG. 1C and FIG. 1D are a left side view, a top view, a bottom view, and a front view, respectively, of the LED lamp system 1. FIG. 2 is a cross sectional view showing the LED lamp system 1. FIG. 3 is a perspective view showing lead members 31, 32 used as a connection terminal 3 of the LED lamp system 1.

A bullet-type LED lamp 2 is soldered to a printed circuit board 4. The lead members 31, 32 as the connection terminal 3 are folded by nearly 90 degrees at one end thereof to provide soldering parts 311, 321. The soldering parts 311, 321 are inserted penetrating through corresponding insertion holes in the printed circuit board 4 and soldered to the back surface of the printed circuit board 4 to secure the lead members 31, 32 to the printed circuit board 4. A circuit is printed on the printed circuit board 4 and between the LED lamp 2 and the lead members 31, 32. A circuit protection element such as a resistor and a diode is mounted on the printed circuit board 4 for protecting the concerned circuit and the LED lamp 2.

The printed circuit board 4 with the LED lamp 2 and the lead members 31, 32 soldered thereto is inserted and fixed to a case 5. The case 5 is provided with a nail portion (or engagement portion) 51 for attaching the LED lamp system 1 to an external member (e.g., an in-vehicle roof or door), and a cylindrical portion 52 to which a light guiding member such as a rod-like light guiding member or an optical fiber is inserted for optically controlling light emitted from the LED lamp 2. The case 5 is further provided with an attachment hole 54 for facilitating attachment to the external member and allowing firm fixation of the case 5 thereto. In this embodiment, the LED lamp system 1 used as an in-vehicle illumination light source can surely prevent its disengagement from the external member by being fixed thereto by a fixing member such as a screw and a rod with the attachment hole 54 since it may be separated or disengaged from the external member due to vibration etc. in driving the vehicle when being fixed thereto with only the nail portion 51. By constructing the case 5 as above, the LED lamp system 1 can be enhanced in versatility such that it can be used not only for the in-vehicle light source but also for the other application.

The lead members 31, 32 are each further provided with branch parts 312, 322 folded in the opposite direction (i.e., in the direction separating from the printed circuit board 4) of the folded soldering parts 311, 321. The branch parts 312, 322 are held sandwiched by a holding portion 53 formed in the case 5. Thereby, external force applied when connecting the connection terminal 3 to the external connector can be prevented from concentrating on the solder joint portion, i.e., the soldering parts 311, 321, so that no crack or electrical connection failure can be caused therein.

Here, by disposing the branch parts 312, 322 over (or inside) the printed circuit board 4, the branch parts 312, 322 can be firmly held between the holding portion 53 and the printed circuit board 4. If the branch parts 312, 322 are disposed outside the printed circuit board 4, the external force in connection is dispersed to the holding portion 53, the branch parts 312, 322 and the soldering parts 311, 321. In this case, if the external force is applied in the direction away from the holding portion 53, the branch parts 312, 322 may be disengaged from the holding portion 53 to cause a failure such as deformation in the connection terminal 3. This failure can be prevented by firmly holding the branch parts 312, 322 between the holding portion 53 and the printed circuit board 4.

The LED lamp system 1 is provided with a cover 6 for enclosing the LED lamp 2 and the printed circuit board 4 together with the case 5. The cover 6 is fixed to the case 5 by a nail portion 61 formed on the side face thereof. The over 6 is preferably provided with a support portion 63 such as a rib portion at a position where it is opposed to the branch parts 312, 322 via the printed circuit board 4. The support portion 63 can not only support the printed circuit board 4 but also serve to further disperse the external force in connection such that malfunction can be prevented when the LED lamp system 1 is subjected to vibration or unexpected external force.

The case 5 is provided with the cylindrical portion 52 to which the light guiding member such as a rod-like light guiding member or an optical fiber is inserted for guiding light emitted from the LED lamp 2 for illumination. A stopper such as a protrusion is desirably formed on the inside wall of the cylindrical portion 52 for keeping constant the distance between the light guiding member and the LED lamp 2. Thereby, the light guiding member can be easy positioned when inserted into the cylindrical portion 52. The case 5 with the protrusion can be easy formed by injection molding of a resin.

The cylindrical portion 52 is formed to cover the side face of the LED lamp 2 and disposed to guide light emitted from the LED lamp 2 without leaking out of the system. A reflecting member may be disposed on the inside wall of the cylindrical portion 52 for efficiently guiding light laterally emitted from the LED lamp 2. The reflecting member can be a reflecting layer deposited on the inside wall of the cylindrical portion 52 or a metal film attached onto the inside wall.

The printed circuit board 4 has circuit protection elements (not shown) mounted thereon other than the LED lamp 2. The circuit protection elements include a Zener diode connected in parallel with the LED lamp 2 and a resistor connected in series with the LED lamp 2. The other known circuit protection elements may be mounted on the printed circuit board 4.

The circuit protection element is desirably a predetermined distance away from the soldering parts 311, 321 of the connection terminal 3. This is because such a distance can prevent failure that may be caused by heat generated during soldering or can prevent slight deformation of the printed circuit board 4 that may be caused when external force is applied thereto, whereby the circuit element mounted on the printed circuit board 4 may be also affected by the external force.

In this embodiment, the bullet-type LED lamp is used as the LED lamp 2. Alternatively, known LED lamps such as an SMD type or side view (SV) mount type LED lamp may be used other than the bullet-type LED lamp. Meanwhile, in consideration of light guiding efficiency into the light guiding member connected to the case 5 and easiness in connection, it is preferable to use the bullet-type LED lamp. The SMD type can be used to enhance the light guiding efficiency by adding a light focusing member such as a lens. However, in this case, the assembly process or components of the LED lamp system 1 may be relatively complicated.

As described above in the first embodiment, it is preferable that the case 5 and the cover 6 are each formed as a separate member. By forming them as a separate member, the versatility of the LED lamp system 1 can be significantly enhanced such that the way of attaching it to the external member or supporting the light guiding member can be modified only by changing the outer shape of the case 5.

Second Embodiment

Figure 4:
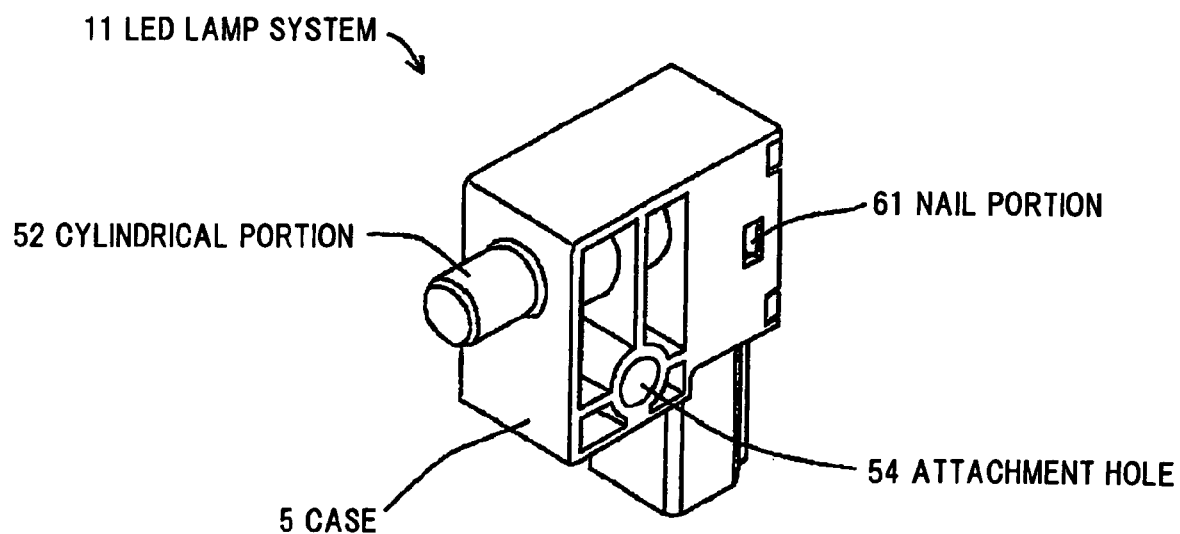
FIG. 4 is a perspective view showing an LED lamp system in a second preferred embodiment according to the invention.
Figure 5:
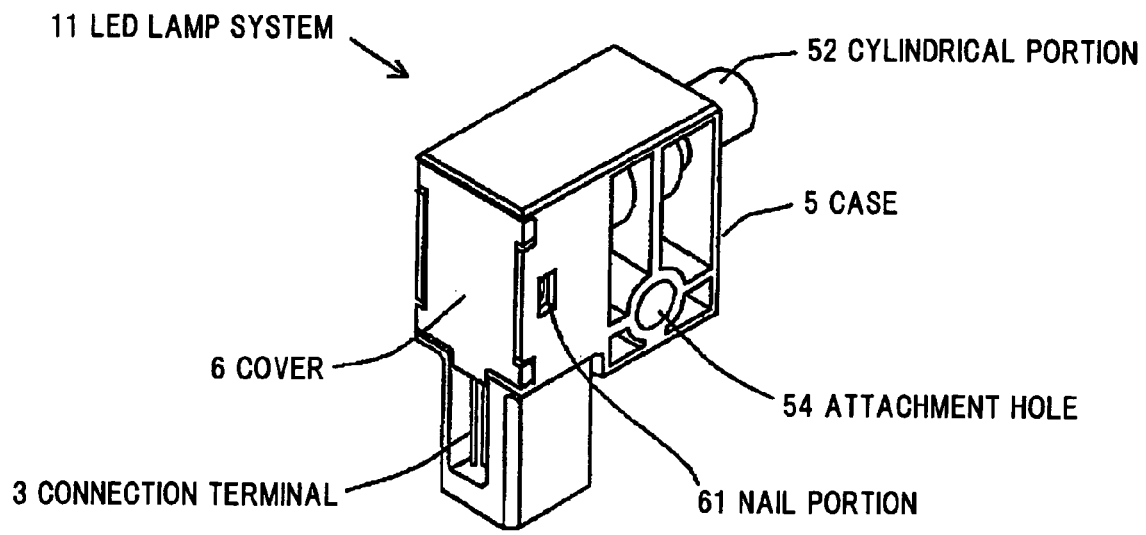
FIG. 5 is a perspective view showing the LED lamp system of the second embodiment.

As shown in FIGS. 4 and 5, an LED lamp system 11 in the second preferred embodiment of the invention can be, according to the versatility, made in which the case 5 is modified in formation. In FIGS. 4 and 5, like components are indicated by the same numerals as used in the first embodiment.

As shown in FIGS. 4 and 5, the second embodiment is different from the first embodiment in that the nail portion 51 is removed and the attachment hole 54 is formed cylindrical. The cylindrical attachment hole 54 allows more firm attachment of the system than the first embodiment such that the system can be fixed to the external member by using a fixing member such as a screw and a rod in association with the attachment hole 54. Optionally, where the fixing member is a screw, the inside wall of the attachment hole 54 may be threaded to receive the screw. Thereby, the system can be securely positioned by being rotated around the fixing member as a rotational axis. Meanwhile, in case of forming the cylindrical attachment hole 54 as above, ribs extending horizontally and vertically from the outside wall as shown are preferably formed to prevent the deformation of the attachment hole 54.

Third Embodiment

Figure 6:
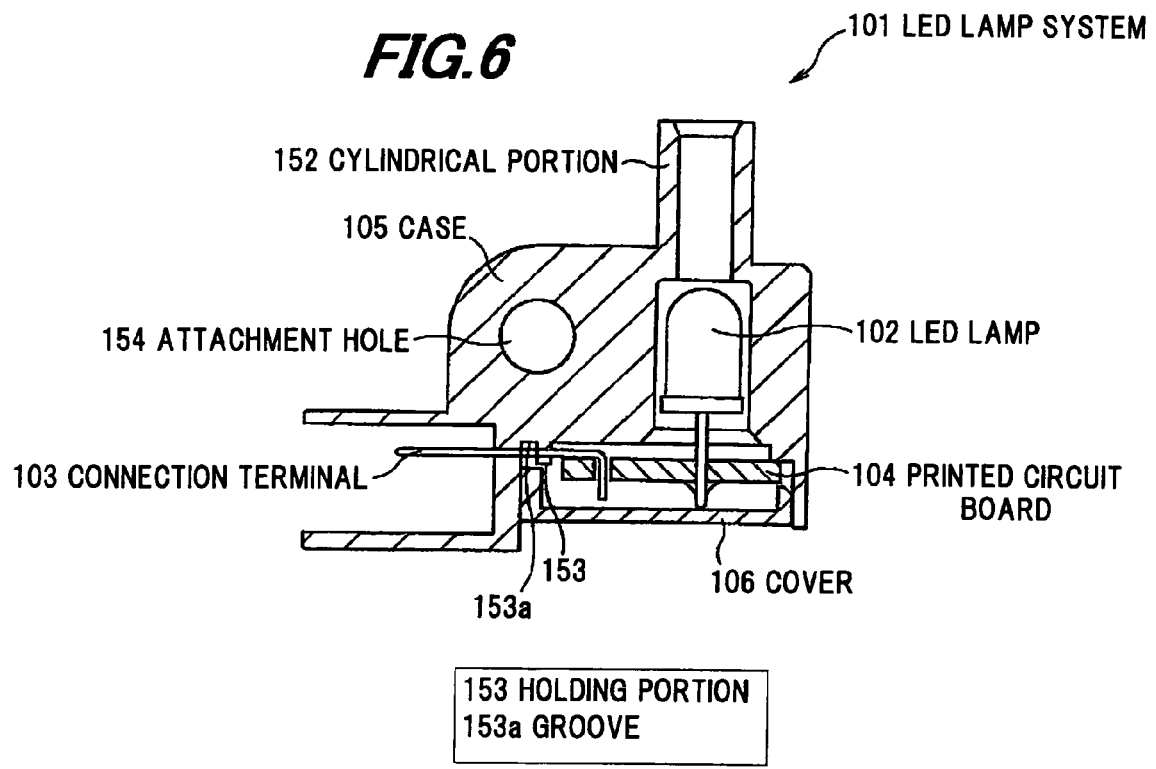
FIG. 6 is a cross sectional view showing an LED lamp system in a third preferred embodiment according to the invention.
Figure 7:
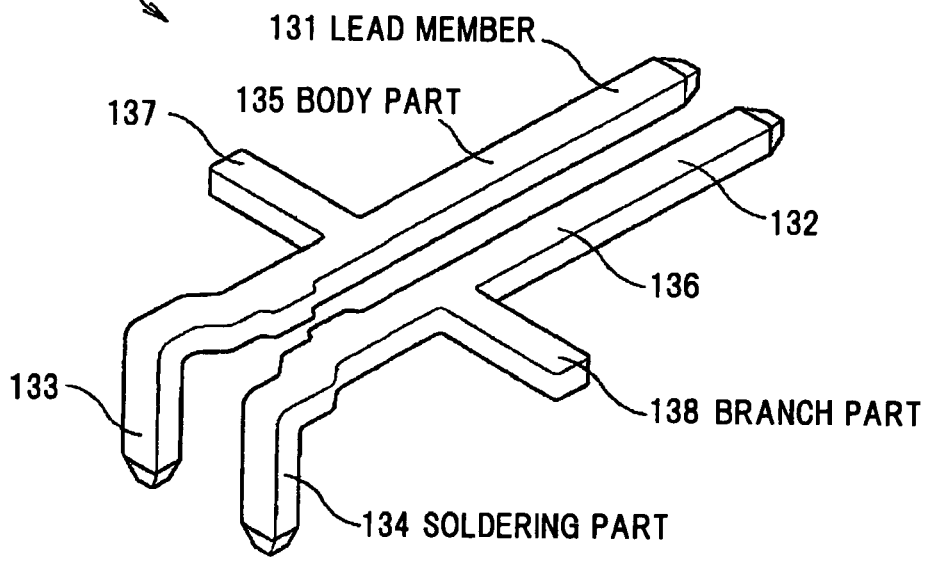
FIG. 7 is a perspective view showing connection terminals used for the LED lamp system of the third embodiment.
Figure 8:
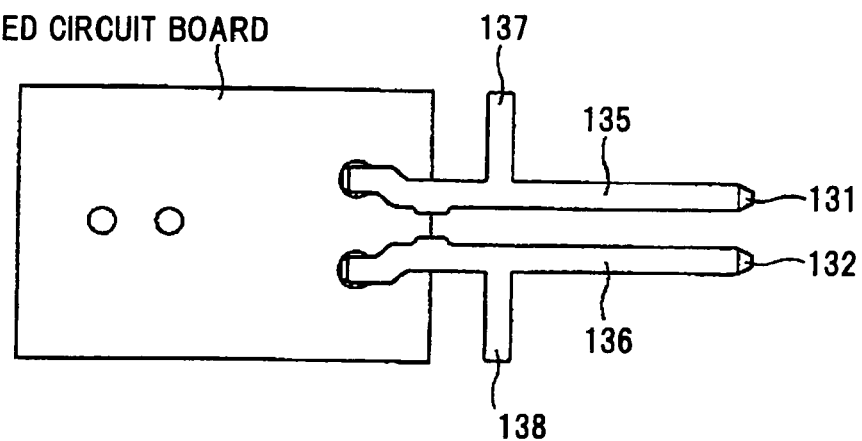
FIG. 8 is a top view showing the connection terminals and a printed circuit board used for the LED lamp system of the third embodiment.

FIGS. 6 to 8 show an LED lamp system 101 in the third preferred embodiment of the invention. FIG. 6 is a cross sectional view showing the LED lamp system 101, FIG. 7 is a perspective view showing lead members 131, 132 as a connection terminal 103, and FIG. 8 is a top view showing the connection terminal 103 and a printed circuit board 104.

As shown in FIG. 6, the LED lamp system 101 is composed of a printed circuit board 104 on which a bullet-type LED lamp 102 is mounted, the connection terminal 103 electrically connected to the printed circuit board 104, a case 5 to which the printed circuit board 104 is fixed, and a cover 106 in which the LED lamp 102 and the printed circuit board 104 are enclosed in association with the case 105. The LED lamp 102 is mounted on the printed circuit board 104 by soldering. The LED lamp 102 may be the SMD type or the SV type other than the bullet-type.

As shown in FIG. 7, the connection terminal 103 is composed of a pair of lead members 131, 132 on the cathode and anode sides. The lead members 131, 132 are composed of soldering parts 133, 134 inserted and soldered to the printed circuit board 104, body parts 135, 136 extending parallel to the printed circuit board 104 from the soldering parts 133, 134, and branch parts 137, 138 extending in a predetermined direction from the body parts 135, 136.

The soldering parts 133, 134 are formed such that one end of the body parts 135, 136 of the lead members 131, 132 is bent nearly at a right angle. The soldering parts 133, 134 are inserted penetrating through corresponding insertion holes in the printed circuit board 104 from the top surface side to the back surface side and soldered to the back surface of the printed circuit board 104 to secure the lead members 131, 132 to the printed circuit board 104. In this embodiment, the branch parts 137, 138 extend in the direction nearly orthogonal to the lead members 131, 132 and parallel to the printed circuit board 104. As shown in FIG. 8, the end of the branch parts 137, 138 extends to the same position as the end of the printed circuit board 104 in the width direction of the printed circuit board 104 (in top view).

The printed circuit board 104 is formed rectangular (in top view) and fixed to the case 105 by engagement. Here, the way of engaging the printed circuit board 104 with the case 105 can be determined arbitrarily. For example, the printed circuit board 104 with the LED lamp 102 mounted thereon may be engaged with the case 105 or printed circuit board 104 may be directly engaged with the case 105. Alternatively, the printed circuit board 104 may be fixed to the case 105 without engagement.

The printed circuit board 104 has the LED lamp 102 and the lead members 131, 132 mounted thereon and disposed away from each other, between which the circuit is printed. A circuit protection element such as a resistor and a diode is mounted on the printed circuit board 104 for protecting the concerned circuit and the LED lamp 102. Here, the circuit protection element is desirably a predetermined distance away from the soldering parts 133, 134 of the connection terminal 103.

The case 105 encloses the LED lamp 102 and the printed circuit board 104 in association with the cover 106, and is provided with a holding portion 153 for holding the branch parts 137, 138 of the connection terminal 103. In this embodiment, the holding portion 153 is provided with a groove 153a extending parallel to the printed circuit board 104 such that the branch parts 137, 138 are sandwiched in the width direction thereof and held by the groove 153a. Thereby, even if the connection terminal 103 is subjected to load in the direction rotated around the soldering parts 133, 134 as a rotational axis, or load in the direction extending the body parts 135, 136, the connection terminal 103 can be held by the holding portion 153. Thus, external force applied when connecting the connection terminal 103 to an external connector can be prevented from concentrating on the solder joint portion, i.e., the soldering parts 133, 134, so that no crack or electrical connection failure can be caused therein.

Also in this embodiment, like the first embodiment, the cover 106 is fixed to the case 105 by a nail portion (not shown) formed on the side face of the cover 106. The case 105 is provided with a nail portion (or engagement portion) (not shown) for attaching the LED lamp system 101 to an external member (e.g., an in-vehicle roof or door), and a cylindrical portion 152 to which a light guiding member such as a rodlike light guiding member or an optical fiber is inserted for optically controlling light emitted from the LED lamp 102. The case 105 is further provided with an attachment hole 154 for facilitating attachment to the external member and allowing firm fixation of the case 105 thereto.

A method of making the LED lamp system 101 thus composed will be described below.

First, the soldering parts 133, 134 of the printed circuit board 104 are inserted into the insertion holes in the printed circuit board 104 and fixed thereto by soldering (Soldering step). The LED lamp 102 may be mounted on the printed circuit board 104 simultaneously when or before or after mounting the connection terminal 103 thereon.

Then, the printed circuit board 104 is fixed to the case 105 such that the branch parts 137, 138 extending in the predetermined direction from the body parts 135, 136 of the connection terminal 103 is held by the holding part 153 formed in the case 105 (Fixing step).

Then, the cover 106 is attached to the case 105 such that the LED lamp 102 and the printed circuit board 104 are enclosed by the cover 106 as well as the case 5 (Enclosing step).

Where the printed circuit board 104 is held by the cover 106, the printed circuit board 104 as well as the cover 106 can be fixed to or enclosed by the case 105. In other words, the fixing step can be conducted together with the enclosing step.

As mentioned above, the LED lamp system 101 is formed such that the branch parts 137, 138 of the connection terminal 103 are held by the holding portion 105 of the case 105. Therefore, even if load is applied to the body parts 135, 136 of the connection terminal 103, deformation of the connection terminal 103 and occurrence of excessive stress or moment to the soldering parts 133, 134 can be prevented. Thus, if external force is excessively applied to cable insertion tube 103 during connecting to the external connector, deformation of the connection terminal 103 can be prevented or the soldering parts 133, 134 can be prevented from having crack or electrical connection failure.

Further, the LED lamp system 101 of this embodiment is formed such that the branch parts 137, 138 of the connection terminal 103 extend parallel to the printed circuit board 104. Thereby, the height of the connection terminal 103 protruding upward from the surface of the printed circuit board 104 can be minimized. Thus, the vertical size of the enclosure space defined by the case 105 and the cover 106 for enclosing the LED lamp 102 and the printed circuit board 104 can be reduced such that the entire system can be low-profile.

Further, the branch parts 137, 138 are extended to the same position as the end of the printed circuit board 104 in the width direction such that they can extend as long as possible within the enclosure space defined by the case 105 and the cover 106 to prevent deformation of the connection terminal 103. Thus, the enclosure space defined by the case 105 and the cover 106 in accordance with the size of the printed circuit board 104 does not need to be changed or expanded according to the length of the branch parts 137, 138. This is very advantageous on the aspect of practical use.

In the third embodiment, the branch parts 137, 138 of the connection terminal 103 are formed to eliminate overlap (in top view) with the printed circuit board 104. However, the branch parts 137, 138 may be formed to overlap (in top view) with the printed circuit board 104 such that they can be held and sandwiched between the case 105 and the printed circuit board 104 in the enclosing step.

Further, in this composition, the cover 106 may be provided with a support portion formed opposite the branch parts 137, 138 of the connection terminal 103 in relation to the printed circuit board 104 for supporting the printed circuit board 104. In this case, in the enclosing step, the support portion of the cover 106 can support the printed circuit board 104 at a part opposite the branch parts 137, 138 of the connection terminal 103.

In the third embodiment, the case 105 may be provided with a positioning portion located between the body parts 135, 136 of the connection terminal 103 such that the connection terminal 103 can be positioned by the positioning portion.

Further, in the above embodiments, the cylindrical portions 52, 152 of the case 5, 105 may be omitted.

INDUSTRIAL APPLICABILITY

The LED lamp system of the invention can suitably apply to a light source for in-vehicle illumination (e.g., roof indirect illumination or foot illumination) or for guiding light to various linear light guiding members.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:
1. An LED lamp system, comprising:
a light emitting diode (LED) lamp;
a printed circuit board on which the LED lamp is mounted;
a connection terminal comprising a soldering part inserted and soldered to the printed circuit board, a body part extending parallel to the printed circuit board, and a branch part extending from the body part in a predetermined direction;
a case to which the printed circuit board is fixed, the case comprising a holding portion for holding the branch part of the connection terminal; and
a cover for enclosing the LED lamp and the printed circuit board in association with the case.

2. The LED lamp system according to claim 1, wherein the branch part of the connection terminal is sandwiched by the case and the printed circuit board.

3. The LED lamp system according to claim 2, wherein the cover comprises a support portion formed opposite the branch part of the connection terminal in relation to the printed circuit board for supporting the printed circuit board.

4. An LED lamp system, comprising:
a light emitting diode (LED) lamp;
a printed circuit board on which the LED lamp is mounted;
a case engaging with and supporting the printed circuit board; and
a cover for enclosing the LED lamp and the printed circuit board in association with the case;
wherein the printed circuit board comprises a connection terminal protruding from the cover and the case for connecting to an external connector, the connection terminal comprising a soldering part inserted and soldered to the printed circuit board, and a branch part folded opposite the soldering part, and
wherein the branch part is sandwiched and held by a holding portion formed on an inside wall of the case for preventing a failure caused by external force applied when connecting the connection terminal to the external connector.

5. The LED lamp system according to claim 4, wherein the branch part is disposed on the printed circuit board, and sandwiched and held by the holding portion and the printed circuit board.

6. The LED lamp system according to claim 5, wherein the cover comprises a support portion formed opposite the branch part in relation to the printed circuit board for supporting the printed circuit board.

7. The LED lamp system according to claim 6, wherein the case comprises a cylindrical portion for supporting a rod-like light guiding member, and the system is used as an in-vehicle light source for emitting light through the rod-like light guiding member.

8. The LED lamp system according to claim 6, wherein the case comprises an attachment hole for attaching the system to an vehicle, and the attachment hole is threaded on an inside wall thereof.

* * * * *